Patented Mar. 25, 1924.

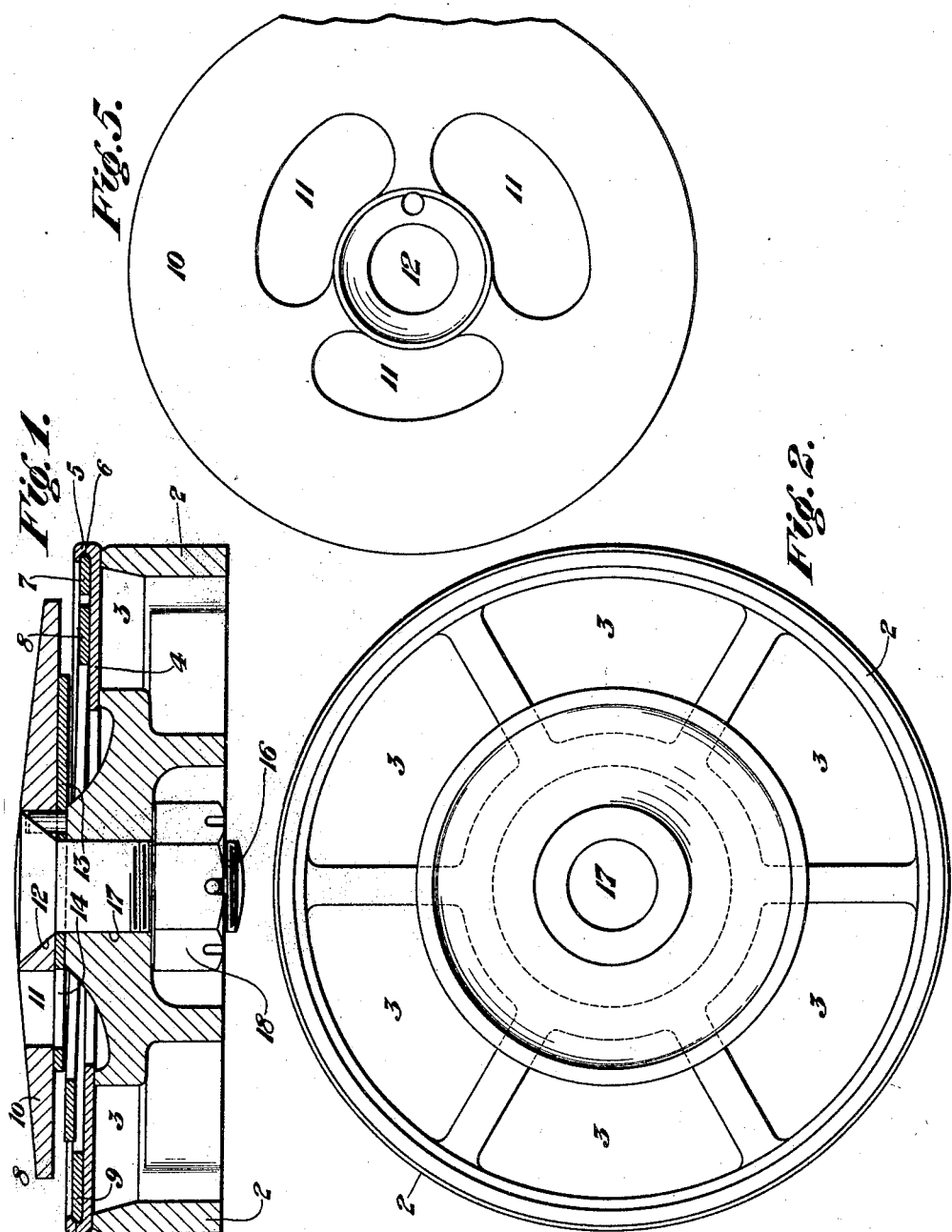

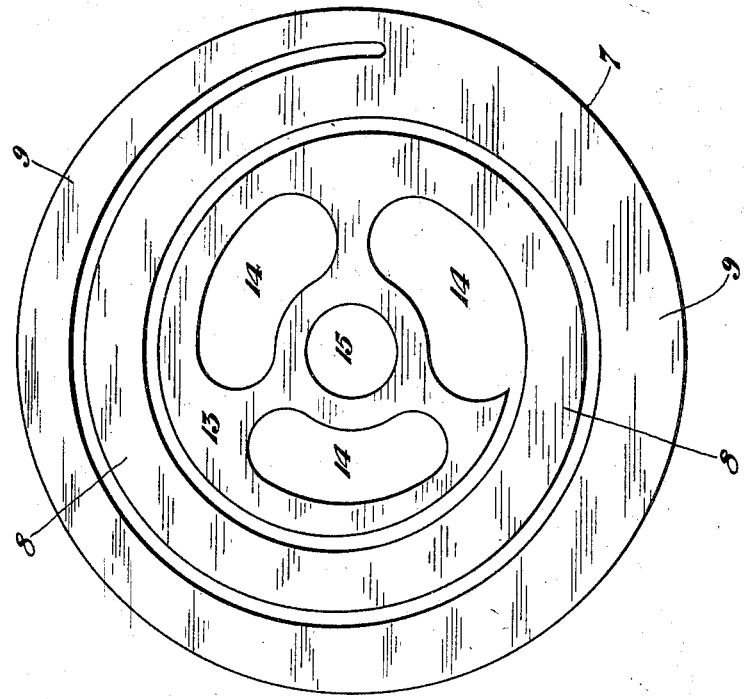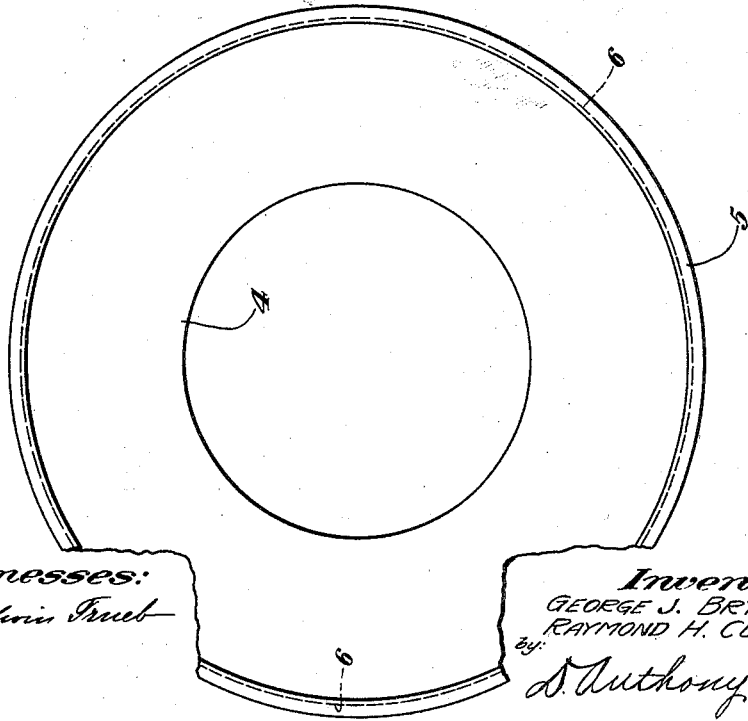

1,488,147

UNITED STATES PATENT OFFICE.

GEORGE J. BRYEN AND RAYMOND H. CURRIE, OF DUQUESNE, PENNSYLVANIA.

VALVE.

Application filed December 1, 1921. Serial No. 519,221.

*To all whom it may concern:*

Be it known that we, GEORGE J. BRYEN and RAYMOND H. CURRIE, citizens of the United States, and residents of Duquesne, in the county of Allegheny and State of Pennsylvania, have invented certain new and useful Improvements in Valves, of which the following is a specification.

This invention relates to valves for blowing engines, compressors, pumps, and other like machines employed for handling liquids and gases, and more particularly valves of this class employing a valve which is spring supported and spring guided.

The principal object of our invention is to provide a valve of this class having a novel and improved construction whereby the spring is securely fastened to a valve plate.

In the accompanying drawings, Figure 1 is a vertical sectional elevation of a valve constructed in accordance with our invention.

Figure 2 is a plan view of the valve seat.

Figure 3 is a plan view of the valve plate.

Figure 4 is a plan view of the valve spring.

Figure 5 is a plan view of the stop plate.

Referring particularly to the drawings, the numeral 2 designates the valve seat having a plurality of openings 3. A ring-like valve plate 4 is mounted on the valve seat 2 so as to overlie and normally close the ports 3. The valve plate 4 is provided around its periphery with an integral upstanding continuous edge or shoulder 5 which has its inner face undercut to form a continuous groove or socket 6.

The valve plate 4 is adapted to be spring supported and spring guided, and a coil spring 7 is provided for supporting and guiding the valve. The spring 7 is preferably formed from a flat plate or disk. The disk is cut spirally from a point spaced from its outer edge inwardly so as to form the spring convolutions 8 and provide a continuous outer rim or ring 9.

The spring 7 is adapted to be sprung or pressed into the groove or socket 6 formed around the valve plate 4 and is of such a diameter as to fit snugly within said groove and form a rigid connection after being forced into place.

A stop plate 10 is mounted so as to overlie the spring 7 and is provided with port openings 11 and a central bolt receiving aperture 12.

The central or small end of the spring 7 is in the form of a circular plate or disk 13 and is provided with port openings 14 adapted to aline with the port openings 11 in the stop plate 10 and also provided with a central bolt aperture 15. A bolt 16 is passed through the apertures 12 and 15 in the stop plate 10 and portion 13 of spring 7, respectively, and through a central aperture 17 in the valve seat 2 and has a nut 18 screw threaded thereon to firmly clamp the stop plate 10, spring 7, and valve seat 2 together.

The valve plate 4 may be either machined to form the shoulder 5 or the plate may be spun, forged or otherwise worked to form the shoulder, as desired.

The feature of the invention is the provision of a continuous attachment for the spring 7 around its entire periphery.

It will be understood that the invention is not limited to the specific valve construction shown, since various modifications employing the novel spring mounting of this invention will readily suggest themselves to those skilled in the art.

We claim:—

1. In a valve, a valve seat having a plurality of ports therein, a flat disk-like valve plate mounted on said seat and adapted to overlie said ports, said valve plate being provided around its periphery with an integral upstanding continuous shoulder, said shoulder having its inner face undercut to form a continuous socket around the periphery of said valve plate, a valve actuating coiled spring formed of relatively thin flat metal adapted to resist lateral deflection of said valve plate and provided with a continuous outer rim, said spring being adapted to overlie substantially the whole area of said valve plate and to have the outer edge of the rim portion fitted tightly within said continuous socket formed on said valve plate.

2. In a valve, a valve seat having a plurality of ports therein, a flat disk-like valve plate mounted on said seat and adapted to overlie said ports, said valve plate being provided around its periphery with an integral upstanding continuous shoulder, said shoulder having its inner face undercut to form a continuous socket around the periphery of said valve plate, a valve actuating coiled spring formed of relatively thin flat metal adapted to resist lateral deflection of said valve plate and provided with a continuous outer rim, said spring being adapted to overlie substantially the whole area of said valve plate and to have the outer edge of the rim portion fitted tightly within said continuous socket formed on said valve plate, a stop disk spaced above and overlying said spring, and means for clamping said stop disk and said spring to said valve seat.

In testimony whereof, we have hereunto set our hands.

GEORGE J. BRYEN.
RAYMOND H. CURRIE.